United States Patent
Benoit

Patent Number: 5,806,452
Date of Patent: Sep. 15, 1998

[54] BOAT SAVER

[76] Inventor: Richard Benoit, 14 Manters Point, Plymouth, Mass. 02360

[21] Appl. No.: 844,368

[22] Filed: Apr. 18, 1997

[51] Int. Cl.⁶ ................................................... B63B 21/04
[52] U.S. Cl. ............................................................ 114/218
[58] Field of Search ..................... 114/343, 364, 114/218, 219; 24/115 R, 129 R, 130

[56] References Cited

U.S. PATENT DOCUMENTS

| | | | |
|---|---|---|---|
| 3,574,900 | 4/1971 | Emery | 114/218 |
| 3,650,236 | 3/1972 | McFarlane | 114/218 |
| 4,587,916 | 5/1986 | Guerette | 114/39.2 |
| 4,895,094 | 1/1990 | Carlstedt | 114/218 |
| 4,998,495 | 3/1991 | Bos et al. | 114/218 |
| 5,493,983 | 2/1996 | Hurt | 114/218 |

*Primary Examiner*—Stephen Avila
*Attorney, Agent, or Firm*—Patent & Trademark Services; Thomas Zack; Joseph H. McGlynn

[57] ABSTRACT

A boat's cleat having opened cord receiving ends with a rail post attachment. Slanted surface grooves within the cleat's opening permit a cord to be squeezed and held therein when subjected to a downward force, like the weight of an attached fender, while an upward force permits the cord's easy removal from the cleat. The post attachment may be a separate member held to the cleat by a hook and screw attachment or may be molded to it as a unitary structure and held to the post by a nut and bolt fastener.

2 Claims, 1 Drawing Sheet

BOAT SAVER

BACKGROUND OF THE INVENTION

Boating in all forms has become very popular. To protect boat's hull when docking resilient protector devices or fenders are usually installed between the dock or its piers and the boat. These protective devices are attached to selected boat posts with lines, cords, etc. having the fenders attached to them. Coordinating the placed of the fenders relative to the boat and dock or piers requires a degree of skill to insure that the moving boat will not become damaged by striking the piers or dock. The present invention seeks to facilitate the installation of the boat's fenders by providing for a post mounted holder for the fender's cord which permit the fender attached cord lines to be released when pulled in one direction and gripped tightly when pulled in the opposite direction.

DESCRIPTION OF THE PRIOR ART

Many of the prior art devices for retaining boat protectors or fenders are known. For example, in U.S. Pat. No. 3,650,236 to McFarlane, a shallow tapered cylindrical knot receiving and clamping channel mounted on a rail is disclosed.

In U.S. Pat. No. 4,895,094 to Carlstedt a fender hanger is described having a railing mounted bent clip with a projecting tongue to which can be attached the boat fender's cord.

Another fender securing device attached to a boat's safety rail is set forth in U.S. Pat. No. 4,998,495 to Bos et al.. having a tubular portion with a converging jam cleat for the line.

In U.S. Pat. No. 5,493,983 to Hurt a portable fender hanger having a channel for a cable which goes through its bail and fairlead with a cam cleat at the cable's free end. The present invention is a post mounted holder for a boat's fender cord having a grooved cord engaging cleat and a post mount as described in this specification.

SUMMARY OF THE INVENTION

This invention relates to a cord holder for a boat's fender wherein an opened cleat with internal grooves is used to hold the cord when force is exerted downwardly and allow the removal of the cord from the cleat's opening by pulling upwardly on the cord.

It is the primary object of the present invention to provide for an improved boat's fender cord holder.

Another object is to provide for such a holder which can be adjusted by pulling on the cord in one direction and released when pulling in the other direction.

These and other objects and advantages of the present invention will become apparent to readers from a consideration of the ensuing description and the accompanying drawings.

DESCRIPTION OF THE PREFERRED EMBODIMENT

Figure 1:
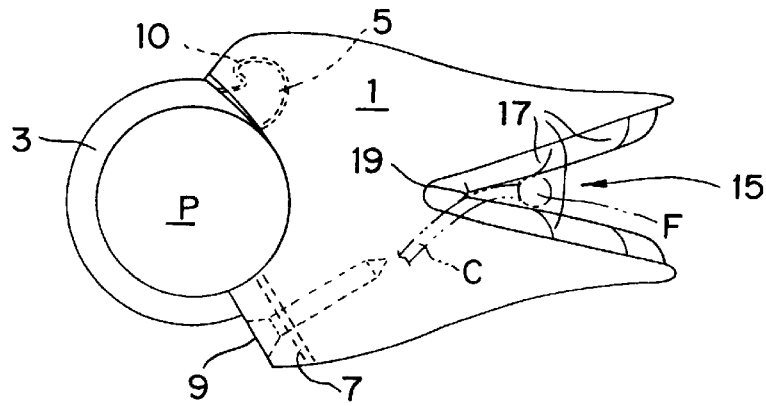
FIG. 1 is a top view of the invention's preferred embodiment mounted on a boat's post.

FIG. 1 is a top view of the invention's preferred embodiment mounted on a boat's deck rail post P. In this embodiment the flexible cleat 1 is shown holding the cord C which in turn is attached to a lower suspended resilient boat fender F. Normally, there are several fenders attached to different boat rails used to cushion the force between the boat and the dock or pier structure. Each fender can take on a variety of shapes and sizes such as a elongated vertically hung sponge-like cushion cylinder. Also depicted in this figure is the tubular shaped opened post engaging attachment 3 which has a molded hook 5 at one of its opened ends and a screw receiving side 7 located at its other opened end. Three screws 9 extended through the attachment's opened side 7 into the adjoining side of the cleat 1 to fasten the attachment to the cleat as the attachment wraps around one of the boat's upright rail posts P. An internal complementary shaped molded cleat groove 10 engages the hook 5 to lock that the attachment's opened end in place to the cleat's body.

Figure 2:
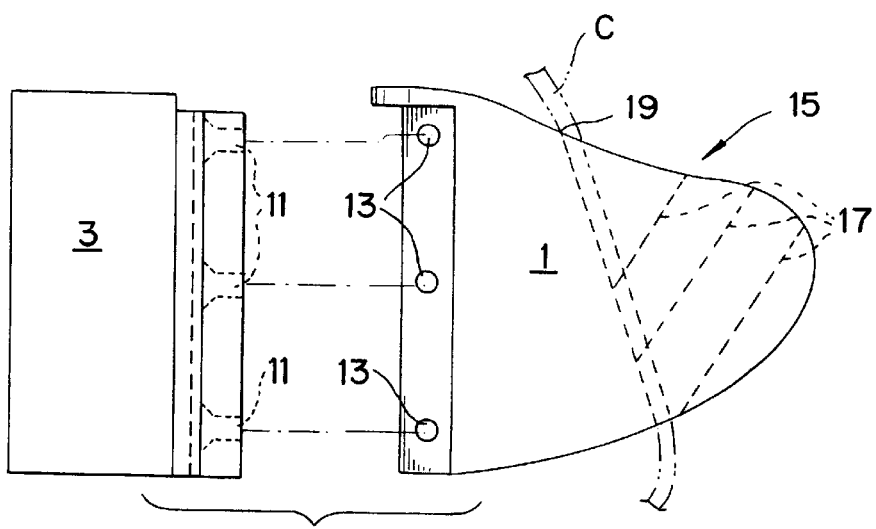
FIG. 2 is a side view of the FIG. 1 embodiment showing the post attachment separated from its cleat.

FIG. 2 is a side view of the FIG. 1 embodiment showing the tubular post attachment 3 separated from its triangular shaped opened cleat 1. Three vertically aligned screw holes 11 are placed in adjoining side 7 and are placed such that they align with the three vertical screw receiving holes 13 located in the cleat's body. Tightening the three in-place screws 9, when the attachment 3 is placed around the boat's rail post and holes 11 and 13 aligned, causes the cleat to be firmly mounted to the post. Located on the cleat's surface within the tapered cord receiving cleat opening 15 are a series of spaced slanted parallel grooves 17 used to grip the cord C. When the cord is in the tapered opening 15 and pulled up and slightly away from the boat in the direction of the arrow toward's the boat's deck, the cord is released from its cleat. Downward pulling on the cord in the opposite direction such as would be exerted by the fender's weight will squeeze the enclosed cord to firmly hold it in the cleat's opening.

In use as fender's weight causes the cord to be squeezed in the opening 15 as the cord also engages the cleat's three surface grooves 17. Pulling generally up on the cord with one hand moves the cord out of these grooves to allow its depending lower fender to be placed at different heights relative to the adjacent dock and pier structure such as would happen when tides change. The inner groove 19 forming the apex for the cleat's opening 15 is slanted downwardly and away from the boat to insure the cord c will be cradled in the narrow cleat surfaces. Along the cord's length the other three spaced cleat grooves 17 extend upwardly and outwardly to engage the cord.

Figure 3:
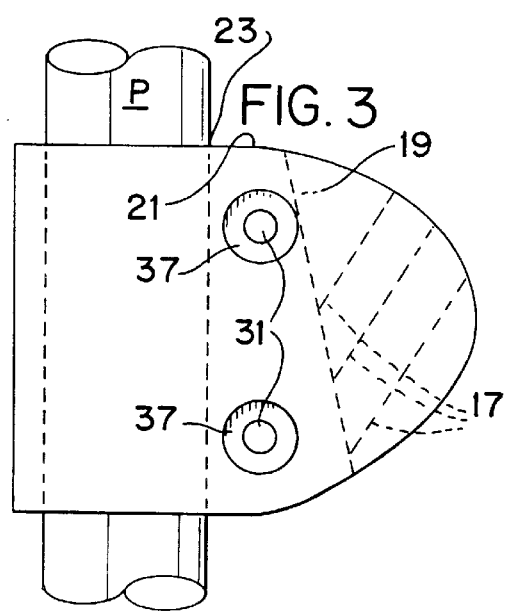
FIG. 3 shows a side view for an alternate embodiment for the invention.
Figure 4:
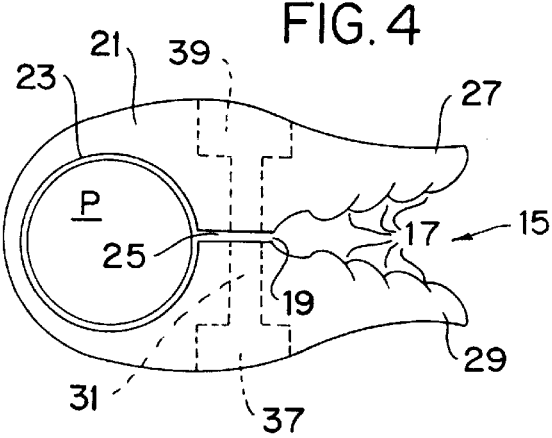
FIG. 4 shows a top view of the FIG. 3 alternate embodiment.

FIG. 3 shows a side view for an alternate second embodiment for the invention and FIG. 4 is its top view.

In this embodiment the cleat and its rail post attachment are molded into a single unitary flexible structure 21. This structure has a post engaging hole 23 which substantially encircles the post P with an end slit opening 25. To mount the structure to the boat's rail post, the structures two extending leg ends 27 and 29 are pulled apart in opposite directions at the same time to expand the slit opening 25. Two horizontally disposed spaced holes 31 extend through the slit opening 25 and act as receptors for a nut and bolt.

Figure 5:
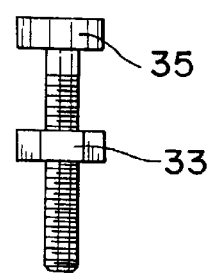
FIG. 5 shows is a side view for post attachment nut and bolt used with the FIG. 3 alternate embodiment.

FIG. 5 shows is a side view for post attachment nut 33 and bolt 35 used with the FIG. 3 alternate embodiment. Indented hole end enlargements 37 and 39 provide receptors within the unitary structure 21 for the nut and bolt, respectively. By tightening the nut and bolt the structure is firmly held to the boat rail post P. The grooves 17 and 19 function as in the first embodiment to engage the cord C to permit its release when pulling up and to squeeze the cord when the fender's weight pulls it down. In this second embodiment the grooves are shown on a slightly more bulbous outer surface in the tapered opening 15 while the inner outwardly slanted groove 19 is located adjacent to the slot's 25 end opening.

The terms "cord: and "fenders" are intended to include all types of ropes, lines or the like which can be used to attach boat protectors or fenders regardless of their shapes or size to the sides of boats, respectively.

Preferably the structure 21 and the cleat 1 and its attachment 3 should be made of a flexible moisture resistant material such as a molded plastic material. Both embodiment can be manufactured by the plastic injection molding process where, the structure 21 could be manufactured by as a single unitary piece while the first embodiment's cleat 1 and its tubular attachment 3 are molded as two different joining pieces.

Although the invention's preferred and alternate embodiments and the method of using the same according to the present invention has been described in the foregoing specification with considerable details, it is to be understood that modifications may be made to the invention which do not exceed the scope of the appended claims and that modified forms of the present invention done by others skilled in the art to which the invention pertains will be considered infringements of this invention when those modified forms fall within the claimed scope of this invention.

What I claim as my invention is:

1. A boat fender's cord holder comprising:

a single unitary flexible cleat and rail post attachment with a post receiving hole adapted to encircle a boat's deck rail post, a slit opening extending from the hole to the cleat portion of the unitary attachment;

an opened cleat having an inner slanted groove forming the apex for the cleat's opening, said cleat having two legs extending from said slit opening with said legs being adapted to be pulled apart in opposite directions to expand the slit opening to permit the mounting of the cleat and rail post attachment the boat's deck rail post in said hole; and said cleat legs having a downwardly tapered groove between them adjacent said slit and cord engaging upwardly slanted grooves on the legs used to engage a cord tightly when pulling down on the cord and to release the cord when pulling up on the cord.

2. The boat fender's cord holder of claim 1, wherein there is bolt receiving hole extending through said slit in the unitary flexible cleat and rail post attachment, said bolt receiving hole having indented enlarged end openings in the unitary flexible cleat and rail post attachment for receiving a bolt's head at one end and a nut at the other end.

* * * * *